(12) United States Patent
Choi (10) Patent No.: US 9,197,989 B2
(45) Date of Patent: Nov. 24, 2015

(54) REFERENCE SIGNAL TRANSMISSION METHOD AND SYSTEM FOR LOCATION MEASUREMENT, LOCATION MEASUREMENT METHOD, DEVICE, AND SYSTEM USING THE SAME, AND TIME SYNCHRONIZATION METHOD AND DEVICE USING THE SAME

(76) Inventor: Ok-Jae Choi, Seoul (KR)

( * ) Notice: Subject to any disclaimer, the term of this patent is extended or adjusted under 35 U.S.C. 154(b) by 142 days.

(21) Appl. No.: 13/993,812

(22) PCT Filed: Dec. 14, 2010

(86) PCT No.: PCT/KR2010/008939
§ 371 (c)(1),
(2), (4) Date: Aug. 28, 2013

(87) PCT Pub. No.: WO2012/081740
PCT Pub. Date: Jun. 21, 2012

(65) Prior Publication Data
US 2013/0337835 A1    Dec. 19, 2013

(51) Int. Cl.
*H04W 64/00* (2009.01)
*H04W 4/02* (2009.01)
*G01S 5/02* (2010.01)
*G01S 11/08* (2006.01)
*G01S 5/06* (2006.01)
*G01S 5/10* (2006.01)

(52) U.S. Cl.
CPC .. *H04W 4/02* (2013.01); *G01S 5/02* (2013.01); *G01S 5/06* (2013.01); *G01S 5/10* (2013.01); *G01S 11/08* (2013.01); *H04W 64/00* (2013.01)

(58) Field of Classification Search
None
See application file for complete search history.

(56) References Cited

U.S. PATENT DOCUMENTS 5,973,643 A * 10/1999 Hawkes et al. ............... 342/457
2005/0003828 A1 * 1/2005 Sugar et al. ................ 455/456.1

FOREIGN PATENT DOCUMENTS

EP           1396730 A1 *  3/2004
KR    10-2009-0048837       * 10/2009

* cited by examiner

*Primary Examiner* — Charles Appiah
*Assistant Examiner* — Margaret G Mastrodonato
(74) *Attorney, Agent, or Firm* — Bacon & Thomas, PLLC

(57) ABSTRACT

Disclosed are a reference signal transmission method and system for location measurement, a location measurement method, device, and system using the same, and a time synchronization method and device using the same. A method for transmitting reference signals at two signal sources according to an embodiment of the present invention includes step (a) of transmitting a reference signal at a first signal source and transmitting a reference signal (hereinafter, a second reference signal) at a second signal source in response to reception of the reference signal from the first signal source, and step (b) of transmitting a reference signal (hereinafter, a first reference signal) at the first signal source in response to reception of the second reference signal from the second signal source, wherein the steps (a) and (b) are repeatedly performed.

11 Claims, 6 Drawing Sheets

FIG. 1

Prior Art

FIG. 2

Prior Art

REFERENCE SIGNAL TRANSMISSION METHOD AND SYSTEM FOR LOCATION MEASUREMENT, LOCATION MEASUREMENT METHOD, DEVICE, AND SYSTEM USING THE SAME, AND TIME SYNCHRONIZATION METHOD AND DEVICE USING THE SAME

BACKGROUND OF THE INVENTION

1. Field of the Invention

The present invention relates to a location measurement technique of a mobile terminal, and more specifically to a reference signal transmission method and system for measuring the location of a mobile terminal using a Time Difference of Arrival (TDOA) scheme etc., a location measurement method, device, and system using the same, and a time synchronization method and device using the same.

2. Description of the Related Art

Technologies for measuring the location of a Mobile Terminal (MT) include a network-based scheme such as an Angle of Arrival (AOA), Time of Arrival (TOA) and TDOA, a handset-based scheme such as a Global Positioning System (GPS), and a hybrid scheme combining a network-based scheme and a handset-based scheme.

A GPS scheme uses a satellite signal provided from a GPS satellite and thus can offer an accurate location of a Mobile Terminal (MT). However, many signal blocking areas are present and the MT needs to be equipped with a GPS receiver in order to implement the GPS scheme.

A location measurement technology that utilizes TDOA or TOA is used, and it is mainly applied in a shadow area of GPS when the GPS receiver is not provided or a hybrid GPS is used.

A location measurement technology using the TDOA scheme will now be briefly described. A time difference of arrival of a signal, TDOA, which is proportional to the difference between distances of a receiver (an MT for example) from two signal sources (two Base Stations (BSs) for example) is measured, and the MT is located on any one of points at which the difference between distances of the MT from the two BSs is constant, i.e. on a hyperbola, the focuses of which are the two BSs. Through this process, two hyperbolas are obtained from three BSs and an intersection point of the two hyperbolas is estimated as the location of the MT.

A location measurement technology using the TOA scheme will now be briefly described. A time of arrival of a signal, TOA, between an MT and a BS is measured to measure a distance therebetween and the MT is located on a circle, the center of which is the BS and the radius of which is the measured distance. Three circles are obtained from at least three BSs and an intersection point of the three circles is estimated as the location of the MT.

To acquire a TDOA between each BS and an MT in the TDOA scheme or a TOA between each BS and an MT in the TOA scheme, time synchronization between each BS and an MT is necessary. This will be described in more detail with reference to FIGS. 1 and 2.

Figure 1:
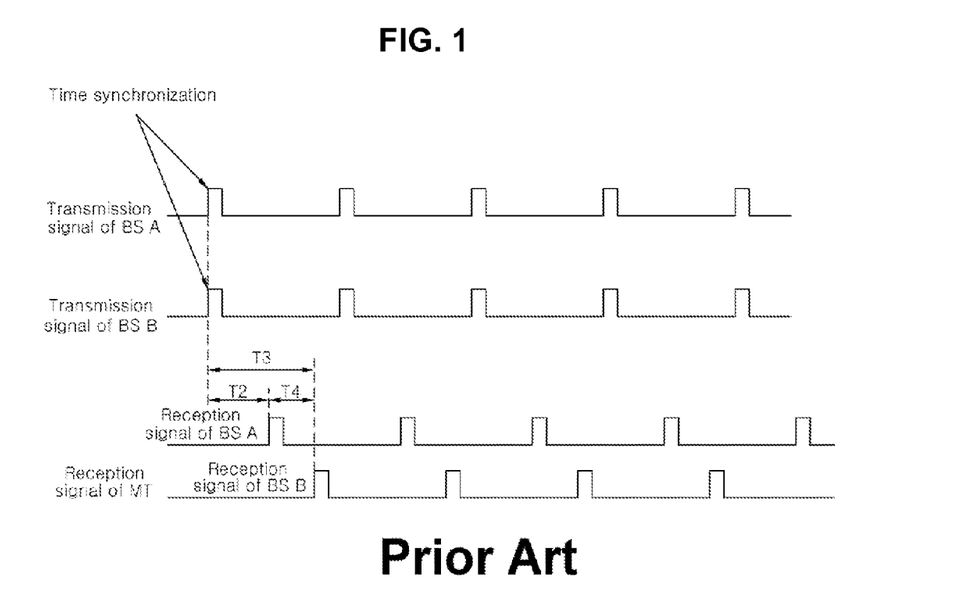
FIG. 1 is a view referred to for describing a TDOA calculation method in a conventional TDOA scheme.

FIG. 1 is a view referred to for describing a TDOA calculation method in a conventional TDOA scheme in order to confirm the location of an MT.

Referring to FIG. 1, two BSs, i.e. a BS A and a BS B, transmit signals synchronized at an absolute time. An MT receives a signal delayed by a signal shift time T2 between the BS A and the MT from the BS A and receives a signal delayed by a signal shift time T3 between the BS B and the MT from the BS B.

Using the signals received by the MT, TOAs T2 and T3 from the BSs to the MT can be obtained or a TDOA T4 (=T3−T2) from the two BSs to the MT can be obtained.

Figure 2:
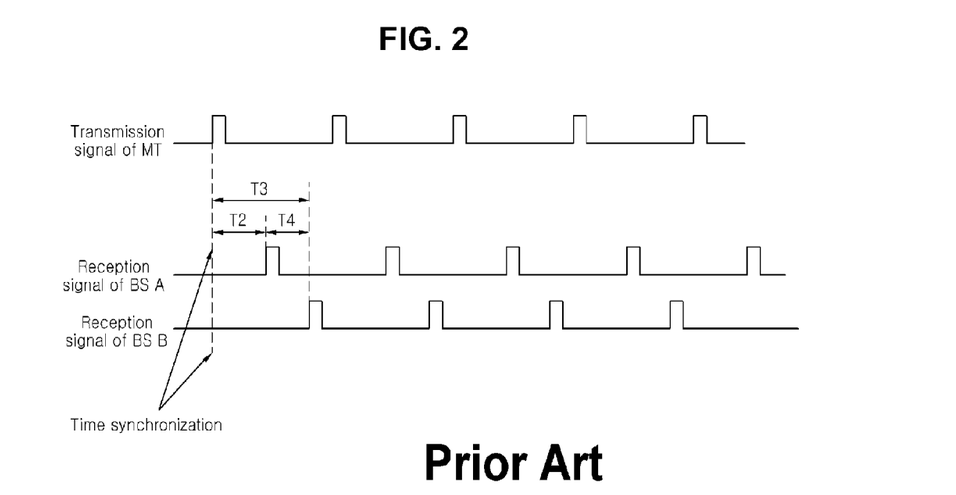
FIG. 2 is a view referred to for describing another TDOA calculation method in a conventional TDOA scheme.

FIG. 2 is a view referred to for describing a TDOA calculation method in a conventional TDOA scheme or a TOA calculation method in a conventional TOA scheme in order to confirm the location of an MT.

Referring to FIG. 2, an MT transmits a predetermined signal (including MT unique information etc.) synchronized at an absolute time to a BS A and a BS B.

The BSs A and B receive a signal transmitted by the MT based on an absolute time. That is, the BS A receives a signal delayed by a signal shift time T2 between the BS A and the MT from the MT and the BS B receives a signal delayed by a signal shift time T3 between the BS B and the MT from the MT. A TOA T2 of the signal from the MT to the BS A can be obtained using the signal received by the BS A, and a TOA T3 of the signal from the MT to the BS B from the MT can be obtained using a signal received by the BS B. The difference between the TOAs, i.e. a TDOA T4 (=T3−T2), of the signals from the MT to the two BSs can also be obtained.

In this case, time synchronization between each BS and an MT, which is indispensable in the location measurement technology of the aforementioned TDOA or TOA scheme, is performed using an additional time synchronization system such as a satellite clock.

The time synchronization system plays a major role in achieving a TDOA or TOA based location measurement system. Accordingly, the presence of the time synchronization system causes a substantial increase in the size and cost of the location measurement system.

Furthermore, it is very difficult to achieve a time synchronization system capable of accurately synchronizing each BS. Errors occurring in the process of time synchronization have a negative effect upon the location measurement of the MT.

SUMMARY OF THE INVENTION

Therefore, the present invention has been made in view of the above problems, and it is an object of the present invention to provide a reference signal transmission method and system, a location measurement method, device, and system using the same, and a time synchronization method and device using the same, which are capable of accurately measuring the location of an MT by enabling calculation of a TDOA between each BS and the MT or enabling time synchronization, even without a time synchronization system.

In accordance with the present invention, the above and other objects can be accomplished by the provision of a method for transmitting reference signals at two signal sources, including step (a) of transmitting a reference signal at a first signal source and transmitting a reference signal (hereinafter, a second reference signal) at a second signal source in response to reception of the reference signal from the first signal source, and step (b) of transmitting a reference signal (hereinafter, a first reference signal) at the first signal source in response to reception of the second reference signal from the second signal source, wherein the steps (a) and (b) are repeatedly performed.

In accordance with an aspect of the present invention, the above and other objects can be accomplished by the provision of a method for measuring a location of a mobile terminal, including receiving first and second reference signals from first and second signal sources for transmitting the first and second reference signals using a scheme of transmitting a reference signal of one signal source in response to reception of a reference signal of the other signal source, calculating a Time Difference of Arrival (TDOA) between the first and second reference signals in consideration of the first and second reference signals and a signal shift time between the first and second signal sources, and calculating the location of the mobile terminal using the TDOA and locations of the first and second signal sources.

In accordance with another aspect of the present invention, there is provided a method for measuring a location of a mobile terminal, including receiving a third signal transmitted from a mobile terminal to first and second signal sources for transmitting first and second reference signals using a scheme of transmitting a reference signal of one signal source in response to reception of a reference signal of the other signal source, calculating a Time Difference of Arrival (TDOA) of the third signal transmitted to the first and second reference signals in consideration of a signal shift time between the first and second signal sources, and calculating the location of the mobile terminal using the TDOA and locations of the first and second signal sources.

In accordance with a further aspect of the present invention, there is provided a method for performing time synchronization in a reference signal transmission system including a first signal source for transmitting a starting reference signal and repeatedly transmitting a reference signal (a first reference signal) in response to reception of a reference signal from a second signal source and the second signal source for repeatedly transmitting a reference signal (a second reference signal) in response to reception of the first reference signal from the first signal source, the method including synchronizing a time of a selected one of the first and second signal sources with a time of the other signal source in consideration a signal shift time between the first and second signal sources.

Other details of the present invention are included in a detailed description and the attached drawings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a reference signal transmission method and system, and a location measurement method, device, and system using the same according to a few exemplary embodiments will be described in detail with reference to the attached drawings. In addition, a time synchronization method using the reference signal transmission method and system for location measurement will be described in detail.

Figure 3:
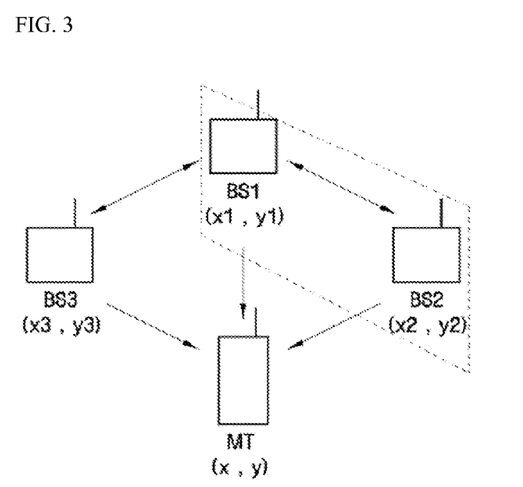
FIG. 3 is a view illustrating a reference signal transmission system and a location measurement system including the reference signal transmission system according to an exemplary embodiment of the present invention.
Figure 4:
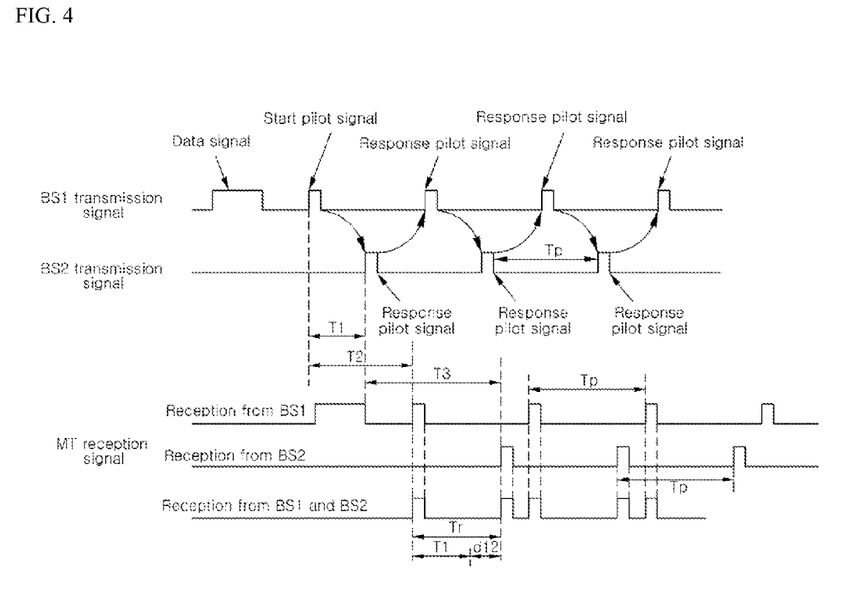
FIG. 4 is a view illustrating transmission signals of first and second BSs and a reception signal of an MT of FIG. 3.

First, a reference signal transmission system according to an exemplary embodiment of the present invention and a reference signal transmission method for the same will be described with reference to FIGS. 3 and 4. In addition, a location measurement system using the reference signal transmission system and a location measurement method in the location measurement system will be described. FIG. 3 is a view illustrating a reference signal transmission system and a location measurement system including the reference signal transmission system according to an exemplary embodiment of the present invention. FIG. 4 is a view illustrating transmission signals of first and second BSs and a reception signal of an MT of FIG. 3.

As illustrated in FIG. 3, a location measurement system according to an exemplary embodiment of the present invention includes three signal sources, for example, first and third BSs BS1, BS2, and BS3, and an MT for receiving signals transmitted from the BSs BS1, BS2, and BS3. As the three signal sources, three satellites may be used instead of the first to third BSs BS1, BS2, and BS3 of the present embodiment.

When the location measurement system of the present embodiment measures the location of the MT using a TDOA scheme, the location of the MT, i.e. (x, y) coordinates, is measured by calculating two hyperbolic functions as indicated by the following Equations 1 and 2. Equation 1 indicates a hyperbolic function, the focuses of which are the first and second BSs BS1 and BS2 and Equation 2 indicates a hyperbolic function, the focuses of which are the first and third BSs BS1 and BS3. The MT is located at the intersection point of the two hyperbolic curves.

$$\sqrt{(x1-x)^2+(y1-y)^2}-\sqrt{(x2-x)^2+(y2-y)^2}=d12*C \qquad \text{[Equation 1]}$$

$$\sqrt{(x1-x)^2-(y1-y)^2}-\sqrt{(x3-x)^2-(y3-y)^2}=d13*C$$

Here, (x1, y1), (x2, y2), and (x3, y3) are location coordinates of the first to third BSs BS1, BS2, and BS3, respectively. d12 denotes a TDOA between the first and second BSs BS1 and BS2 and the MT, d23 denotes a TDOA between the second and third BSs BS2 and BS3 and the MT, and C is the speed of light.

The location coordinates of the first to third BSs BS1, BS2, and BS3 are preset coordinates. The MT may be previously aware of the location coordinates or may receive the location coordinates from the first to third BSs BS1, BS2, and BS3.

Consequently, if the TDOA d12 between the first and second BSs BS1 and BS2 and the MT and the TDOA d13 between the first and third BSs BS1 and BS3 and the MT are calculated, the location (x, y) of the MT can be measured.

The location measurement system of the present embodiment is devised to obtain a TDOA, for example, d12, between each BS and an MT without time synchronization between each BS and the MT and the following reference signal transmission system and reference signal transmission method are proposed. The reference signal transmission system is indicated by dotted lines in FIG. 3.

Referring to the dotted lines of FIG. 3, the reference signal transmission system includes the first and second BSs that transmit reference signals (pilot signals) for location confirmation. A medium of the reference signal may be any of light, electromagnetic wave, and sound wave and a signal path of the reference signal may be vacuum, atmosphere, wire, water, or a combination thereof.

In the reference signal transmission system, the reference signals transmitted by the first and second BSs BS1 and BS2 are generated using a mutual response scheme. The mutual response scheme is described with reference to FIG. 4.

The first BS (BS1) transmits a data signal including BS related information (information about a BS ID, location coordinates, signal shift time between BSs, and delay time) and then transmits a start pilot signal for generating a signal of the mutual response scheme.

The second BS (BS2) receives a BS1 start pilot signal delayed by a signal shift time T1 between the first and second BSs (BS1 and BS2) from the first BS (BS1) and transmits a BS2 response pilot signal in response to the BS1 start pilot signal.

The first BS (BS1) receives the BS2 response pilot signal delayed by the signal shift time T1 between the first and second BSs (BS1 and BS2) from the second BS (BS2) and transmits a BS1 response pilot signal in response to the BS2 response pilot signal. The second BS (BS2) receives the BS1 response pilot signal delayed by the signal shift time T1 between the first and second BSs (BS1 and BS2) from the first BS (BS1) and transmits the BS2 response pilot signal in response to the BS1 response pilot signal. Such processes are repeatedly performed. The BS1 response pilot signal and the BS2 response pilot signal may have different frequencies to distinguish therebetween. For example, if the BS1 response pilot signal has a frequency A and the BS2 response pilot signal has a frequency B, the first BS (BS1) receiving the BS2 response pilot signal of the frequency B may change the BS2 response pilot signal of the frequency B to a signal of the frequency A and transmit the BS1 response pilot signal. Conversely, upon receiving the BS1 response pilot signal of the frequency A, the second BS (BS2) may change the BS1 response pilot signal of the frequency A to a signal of the frequency B and transmit the BS2 response pilot signal.

In this case, the present embodiment represents that no delay occurs between a reception time of the response pilot signal and a transmission time of the response pilot signal in the first and second BSs (BS1 and BS2). That is, in the present embodiment, the second BS transmits the BS2 response pilot signal immediately upon receiving the BS1 pilot signal (start pilot signal or response pilot signal) and the first BS transmits the BS1 response pilot signal immediately upon receiving the BS2 response pilot signal. However, the present invention is not limited thereto. In other embodiments, the first or second BS (BS1 or BS2) may transmit the response pilot signal thereof after a predetermined delay time upon receiving the other party's pilot signal. This will be described later.

In summary, each of the two BSs (BS1 and BS2) transmits a signal in a manner of transmitting a response pilot signal in response to a pilot signal received from the other party. The response pilot signal will hereinafter be referred to as a reference signal because it is a reference signal for location confirmation of the MT. Although not shown in FIG. 3, the first BS BS1 includes a first transmitter for transmitting a reference signal of the first BS BS1, and a first receiver for receiving a reference signal of the second BS BS2, and the second BS BS2 includes a second transmitter for transmitting a reference signal of the second BS BS2, and a second receiver for receiving a reference signal of the first BS BS1.

The response pilot signal of the mutual response scheme is repeatedly transmitted for a predetermined time and then a series of processes of transmitting a data signal including BS related information and transmitting a response pilot signal of the mutual response scheme according to transmission of a start pilot signal is performed. Such processes are repeated at a prescribed period.

The BS1 response pilot signal transmitted by BS1 and the BS2 response pilot signal transmitted by BS2 have a prescribed period Tp (hereinafter, a response signal period). The response signal period Tp is a shift time of a signal transmitted and received between the first BS and the second BS.

In this case, at every middle point of BS1 response pilot signals transmitted by any one BS (the first BS for example), BS2 response pilot signals transmitted by the other party (the second BS for example) is transmitted. In other words, the response pilot signals are alternately transmitted from BS1 and BS2 at a time interval proportional to a distance between BS1 and BS2. Accordingly, a time interval of the response pilot signals alternately transmitted by BS1 and BS2 may be defined as a signal shift time T1 between BS1 and BS2. The signal shift time T1 is equal to $Tp*\frac{1}{2}$.

While the reference signal transmission system and the reference signal transmission method have been described, an embodiment of a location measurement system using the reference signal transmission system and a location measurement method in the location measurement system will be described in detail hereinbelow.

Referring back to FIGS. 3 and 4, the MT located at a prescribed distance from each BS receives the BS1 reference signal and the BS2 reference signal generated by the aforementioned mutual response scheme. At this time, the MT receives the BS1 reference signal delayed by a signal shift time proportional to the distance between the first BS and the MT, i.e. by a signal shift time T2 between the first BS and the MT and receives the BS2 reference signal delayed by a signal shift time proportional to the distance between the second BS and the MT, i.e. by a signal shift time T3 between the second BS and the MT.

The MT calculates the above-described response signal period Tp using the signal received from the first BS BS1 and the signal received from the second BS BS2 and calculates the signal shift time (T1, $T1=Tp*\frac{1}{2}$) between the first and second BSs BS1 and BS2 based upon the response signal period Tp. As another method, the MT may calculate the signal shift time T1 between the first and second BSs BS1 and BS2 from the BS related information data signal including information as to BS ID, location coordinates, and signal shift time between BSs.

As can be seen from FIG. 4, the first BS BS1, the second BS BS2, and the MT are not synchronized at an absolute time. However, in the present embodiment, the MT receives the BS1 reference signal and the BS2 reference signal generated by the above mutual response scheme and may calculate a TDOA (e.g. d12) between each BS and the MT using the received signals and the signal shift time T1 between the first and second BSs BS1 and BS2. Hereinafter, a method through which the MT calculates d12 will be described in detail.

A method for calculating d12 will be described first and a method for measuring the location of the MT using the same will be described later. The MT calculates a TDOA (Tr, hereinafter, referred to as an initial TDOA) between signals transmitted from the first and second BSs BS1 and BS2 to the MT using the signal received by the first BS BS1 and the signal received by the second BS BS2. In this case, since signals transmitted by the first and second BSs BS1 and BS2 of the present invention are not signals synchronized at an absolute time, the initial TDOA Tr is not a TDOA (d12, hereinafter, a final TDOA) between the first and second BSs BS1 and BS2 and the MT, which is to be finally calculated. This is because the BS2 reference signal is a signal more delayed by the signal shift time T1 between the first and second BSs BS1 and BS2 than the BS1 reference signal.

Accordingly, to calculate the final TDOA d12, the MT corrects the initial TDOA Tr in consideration of the signal shift time T1 between the first and second BSs BS1 and BS2 so as to eliminate an influence caused by the BS2 reference signal more delayed by the signal shift time T1 than the BS1 reference signal. For example, the final TDOA d12 may be obtained by subtracting the signal shift time T1 between the first and second BSs BS1 and BS2 from the initial TDOA Tr.

The MT can obtain a hyperbolic curve as indicated by the above Equation 1 using the calculated final TDOA d12 and the previously obtained location coordinates (x1, y1) and (x2, y2) of the first and second BSs BS1 and BS2.

Using the afore-described scheme, the MT can calculate a final TDOA d13 between the first and third BSs BS1 and BS3 and the MT and obtain a hyperbolic curve as indicated by the above Equation 2 using the calculated final TDOA d13 and the previously obtained location coordinates (x1, y1) and (x3, y3) of the first and third BSs BS1 and BS3.

Thus, the location coordinates (x, y) of the MT are calculated by obtaining the intersection point between the two hyperbolic curves.

In summary, the location measurement system of the present invention uses the reference signal transmission system or method for generating a signal by the mutual response scheme. The MT obtains a TDOA by receiving the reference signal. Here, the MT considers a signal shift time between BSs so that an effect of synchronizing each BS or the MT at an absolute time may be obtained.

While the case in which the response pilot signal reception time and the response pilot transmission time in the first and second BSs BS1 and BS2 have no delay has been described hereinabove, delay may occur as described above. This will be described hereinbelow in more detail.

Figure 5:
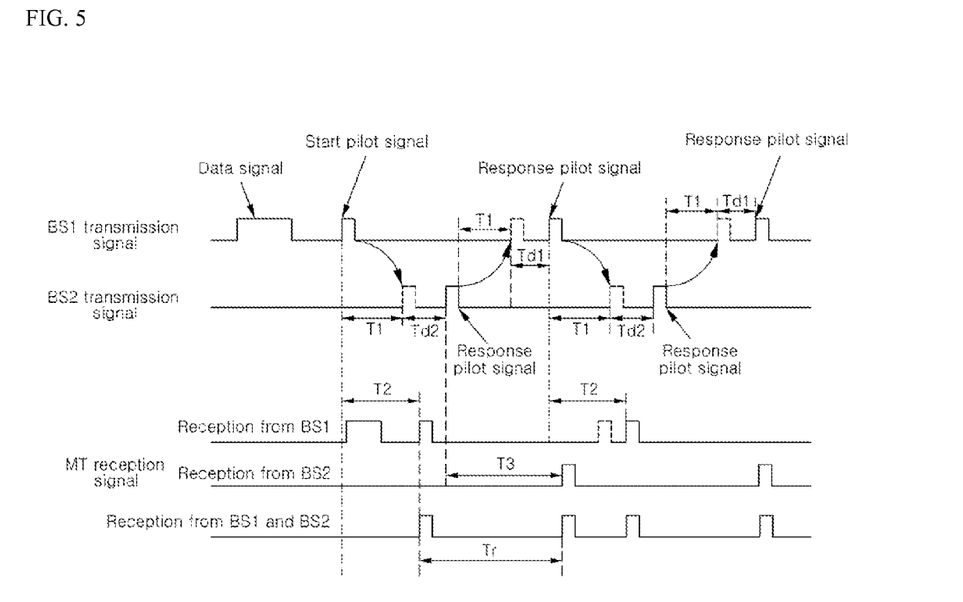
FIG. 5 is a view illustrating transmission signals of first and second BSs and a reception signal of an MT, wherein a delay occurs between a response pilot signal reception time and a response pilot signal transmission time of a first or second BS.

FIG. 5 is a view illustrating transmission signals of first and second BSs and a reception signal of an MT, wherein a delay occurs between a response pilot signal reception time and a response pilot signal transmission time in a first or second BS BS1 or BS2.

Referring to FIG. 5, upon receiving a BS2 response pilot signal, the first BS BS1 transmits a BS1 response pilot signal after a first delay time Td1. Upon receiving a BS1 pilot signal (start pilot signal or response pilot signal), the second BS BS2 transmits the BS2 response pilot signal after a second delay time Td2. That is, while Td1 and Td2 are 0 in the above embodiment, at least one of Td1 and Td2 has a value exceeding 0 in this embodiment. In this case, Td1 and Td2 may have the same or different values. If delay occurs as in this case, two methods may be used to eliminate an influence caused by the delay. One is to consider a delay time at the side of the MT and the other is to eliminate an effect caused by a delay time at the side of the BSs.

First, a method considering delay time at the MT side is as follows.

To obtain d12 in the TDOA scheme, the MT calculates a TDOA (Tr, hereinafter, an initial TDOA) between signals transmitted from the first and second BSs BS1 and BS2 to the MT, using a signal received by the first BS BS1 and a signal received by the second BS BS2 in consideration of the first and second delay times Td1 and Td2. In other words, the MT subtracts a delay time of the first BS BS1, i.e. the first delay time Td1, from a reception time of the signal received from the first BS BS1 and subtracts a delay time of the second BS BS2, i.e. the second delay time Td2, from a reception time of the signal received from the second BS BS2 and then calculates the initial TDOA Tr. A process after calculating the initial TDOA Tr, that is, a process of correcting the initial TDOA Tr in consideration of a signal shift time T1 between the first and second BSs BS1 and BS2 is the same as the previously described process.

If Td1 and Td2 have the same value, calculation of subtracting the first delay time Td1 from a reception time of the signal received from the first BS BS1 and subtracting the second delay time Td2 from a reception time of the signal received from the second BS BS2 need not be performed. This is because subtraction of the same value from the two reception times has no difference with the initial TDOA Tr which is the difference between reception times of signals received from the first and second BSs BS1 and BS2, when the delay time is not considered.

Referring to FIG. 5, although the first delay time Td1 and the second delay time Td2 have an effect on the initial TDOA Tr, a signal shift time T2 between the first BS BS1 and the MT or a signal shift time T3 between the second BS BS2 and the MT is not affected thereby.

In summary, if a delay occur between a response pilot signal reception time and a response pilot signal transmission time in a first or second BS BS1 or BS2, the initial TDOA Tr is calculated in consideration of the delay times Td1 and Td2 in the TDOA scheme, especially when Td1 is different from Td2. However, in order to consider the first delay time Td1 or the second delay time Td2, the MT should receive information about the delay time from the first BS BS1 or the second BS BS2. In other words, the first BS BS1 or the second BS BS2 has to calculate the first delay time Td1 or the second delay time TD2 and transmit information about the delay time to the MT.

To this end, the BS further includes a delay time calculator for calculating a delay time, in addition to a transmitter for transmitting the above-described reference signal and a receiver for receiving the reference signal. This will be described in more detail with reference to FIG. 6.

Figure 6:
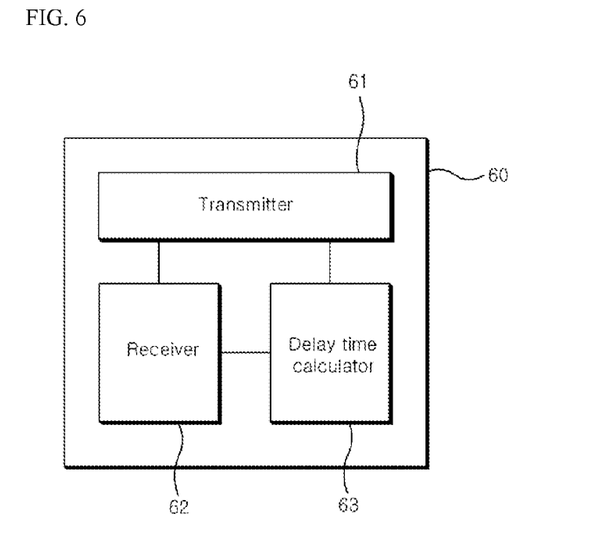
FIG. 6 is a block diagram illustrating the construction of a BS according to an exemplary embodiment of the present invention.

FIG. 6 is a block diagram illustrating the construction of a BS according to an exemplary embodiment of the present invention, wherein a delay time of the BS can be calculated through such construction. The BS shown in FIG. 6 may be, for example, the first BS BS1. However, the second BS BS2 or the third BS BS3 may also have substantially the same construction as the first BS BS1 to calculate a delay time thereof.

Referring to FIG. 6, the first BS BS1 includes a transmitter 61 for transmitting a signal to the exterior, a receiver for receiving a signal from the exterior, and a delay time calculator 63 for calculating a first delay time Td1 of the first BS BS1.

The transmitter 61 may transmit a reference signal of a first BS BS1 (a BS1 reference signal) and the receiver 62 receives a reference signal of the other party, i.e. the second BS BS2 (a BS2 reference signal) as described previously.

The delay time calculator 63 may calculate the difference between a reception time of the BS2 reference signal received by the receiver 62 and a transmission time of the BS1 reference signal transmitted by the transmitter 61 and thus calculate a delay time thereof, i.e. a first delay time Td1. The first delay time Td1 may be included in, for example, a data signal including BS related information of the first BS BS1 and may be provided to the MT. The delay time Td1 may be provided during every data signal transmission or during data signal transmission of a predetermined period.

Next, the method for eliminating a delay time effect at the BS side will be described.

In the TDOA scheme, if the first delay time Td1 and the second delay time Td2 are the same, the influence caused by a delay time need not be considered. Accordingly, if any one of the BSs equalizes a delay time of the other BS to a delay time thereof, the influence caused by the delay times can be eliminated. To this end, the BS further includes a signal transmission adjuster for adjusting a delay time of the BS according to a delay time of the other BS, in addition to the transmitter for transmitting the reference signal and the receiver for receiving the reference signal. Further, the BS may further include a delay time calculator for calculating a delay time thereof and a delay time of the other BS. This will be described in more detail with reference to FIG. 7.

Figure 7:
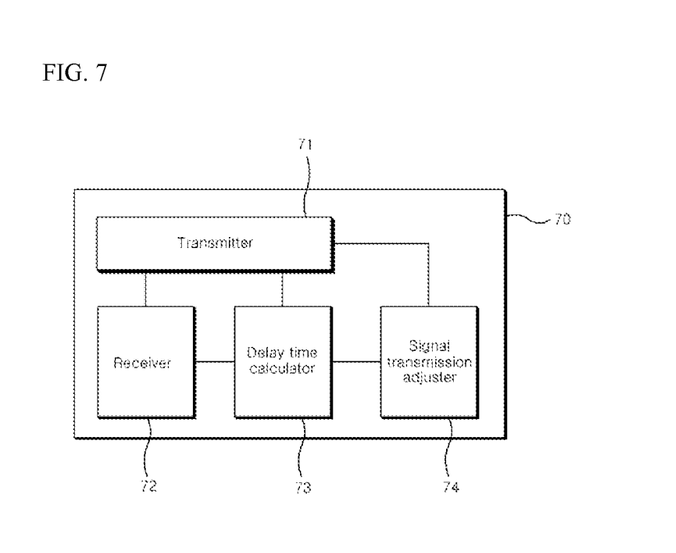
FIG. 7 is a block diagram illustrating the construction of a BS according to another exemplary embodiment of the present invention.

FIG. 7 is a block diagram illustrating the construction of a BS according to another exemplary embodiment of the present invention, wherein a delay time of the BS or a delay time of the other party can be adjusted through such construction. The BS shown in FIG. 7 may be, for example, the first BS BS1. However, the second BS BS2 or the third BS BS3 may also have substantially the same construction as the first BS BS1.

Referring to FIG. 7, the first BS BS1 includes a transmitter for transmitting a signal to the exterior, a receiver 72 for receiving a signal from the exterior, and a signal transmission adjuster 74.

The transmitter 71 may transmit a BS1 reference signal as described above.

The receiver 72 may receives a reference signal of the other party's BS, i.e. a BS2 reference signal, as described above.

The signal transmission adjuster 74 adjusts a delay time of the BS1 reference signal using a second delay time Td2 of the other party, i.e., the second BS. That is, the signal transmission adjuster 74 delays the BS1 reference signal by the same time as the second delay time Td2 instead of the first delay time Td1 according to the second delay time Td2. Then, the transmitter 71 transmits the BS1 reference signal having the second delay time Td2.

The first BS BS1 may be informed of the second delay time Td2 by the second BS BS2 or the first BS BS1 may calculate the second delay time Td2.

If the first BS BS1 is informed of the second delay time Td2 by the second BS BS2, the second BS BS2 may have the construction shown in FIG. 6 and calculate the second delay time Td2 by the method described with reference to FIG. 6. The second BS BS2 may inform the first BS BS1 of the calculated delay time using a wired or wireless path different from the BS2 reference signal.

Alternatively, if the first BS BS1 calculates the second delay time Td2, the first BS1 further includes the delay time calculator 73 for calculating the second delay time Td2. In addition, the transmitter 71 transmits a prescribed signal for calculating a delay time of the other BS, e.g. a delay time of the second BS BS2, (hereinafter, a BS2 delay measurement signal) at the same time as a transmission time of the BS1 reference signal. To facilitate signal determination, the BS2 delay measurement signal may be a signal using a medium, for example, light, electromagnetic wave, or sound wave, different from that used in the BS1 reference signal or may be a signal using the same medium as that used in the BS1 reference signal and using a different frequency from that used in the BS1 reference signal. The receiver 72 receives a signal reflected by the BS2 delay measurement signal from the second BS BS2. The delay time calculator 73 may calculate a delay time of the first BS1, i.e. the first delay time Td1, by calculating the difference between a reception time of the BS2 reference signal received by the receiver 72 and a transmission time of the BS1 reference signal transmitted by the transmitter 71. The delay time calculator 73 may calculate the second delay time Td2 of the second BS BS2 by calculating the difference between a reception time of the BS2 delay measurement signal and a reception signal of the BS2 reference signal. As described above, the BS2 delay measurement signal transmitted at the same time as the BS1 reference signal is immediately reflected from the second BS BS2 and arrives at the first BS BS1. On the other hand, the BS1 reference signal is received by the second BS BS2, is delayed by a prescribed time Td2, and then arrives at the first BS BS1 as the BS2 reference signal.

The method for eliminating a delay time influence at the MT side and the construction of the BS therefor (refer to FIG. 6) have been described hereinabove. In addition, the method for eliminating a delay time influence at the BS side and the construction of the BS therefor (refer to FIG. 7) have been described hereinabove.

Figure 8:
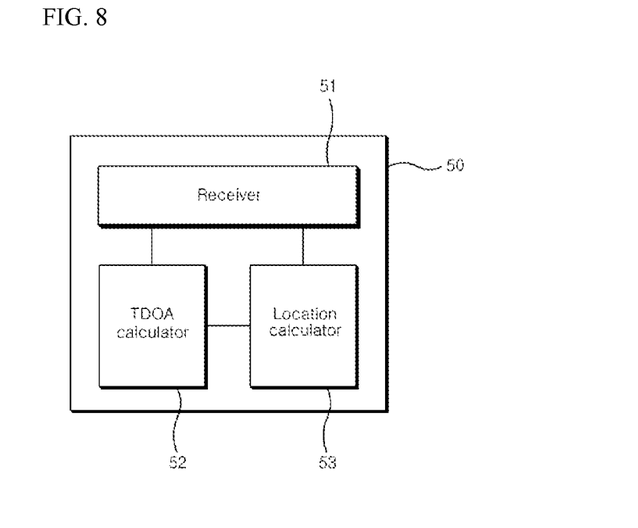
FIG. 8 is a block diagram illustrating a location measurement device according to an exemplary embodiment of the present invention.

FIG. 8 is a block diagram illustrating a location measurement device according to an exemplary embodiment of the present invention. The location measurement device of this embodiment performs an operation similar to the aforementioned operation of the MT of FIG. 3.

As illustrated in FIG. 8, a location measurement device according to an exemplary embodiment of the present invention includes a receiver 51, a TDOA calculator 52, and a location calculator 53.

The receiver 51 receives a BS1 reference signal and a BS2 reference signal generated by the above-described mutual response scheme.

The TDOA calculator 52 calculates an initial TDOA Tr between signals transmitted from the first and second BSs BS1 and BS2 to the MT using the signal received by the first BS BS1 and the signal received by the second BS BS2. If a first delay time Td1 occurs between a response pilot signal reception time and a response pilot signal transmission time in the first BS BS1, a second delay time Td2 occurs between a response pilot signal reception time and a response pilot signal transmission time in the second BS BS2, and the first and second delay times Td1 and Td2 have different values, the arrival time calculator 52 receives information about the first and second delay times Td1 and Td2 from the first and second BSs BS1 and BS2 and calculates the initial TDOA Tr in consideration of Td1 and Td2 as in the above description.

The TDOA calculator 52 obtains a final TDOA ds1 by correcting the initial TDOA Tr in consideration of a signal shift time T1 between the first and second BSs BS1 and BS2, which is calculated using a period Tp of a signal transmitted from the first or second BS BS1 or BS2 or which is obtained from BS related information. This has been described above.

The location calculator 53 obtains a hyperbolic function equation using the final TDOA d12 and previously obtained location coordinates (x1, y1) and (x2, y2) of the first and second BSs BS1 and BS2, thereby acquiring a location (x, y) of the MT.

Figure 9:
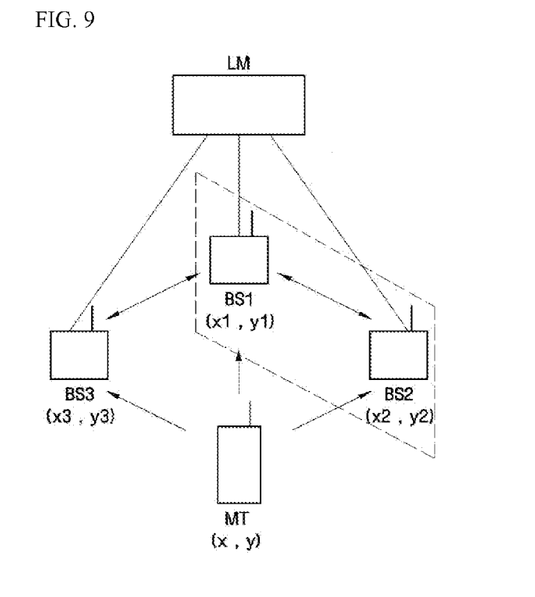
FIG. 9 is a view illustrating a location measurement system according to another exemplary embodiment of the present invention.
Figure 10:
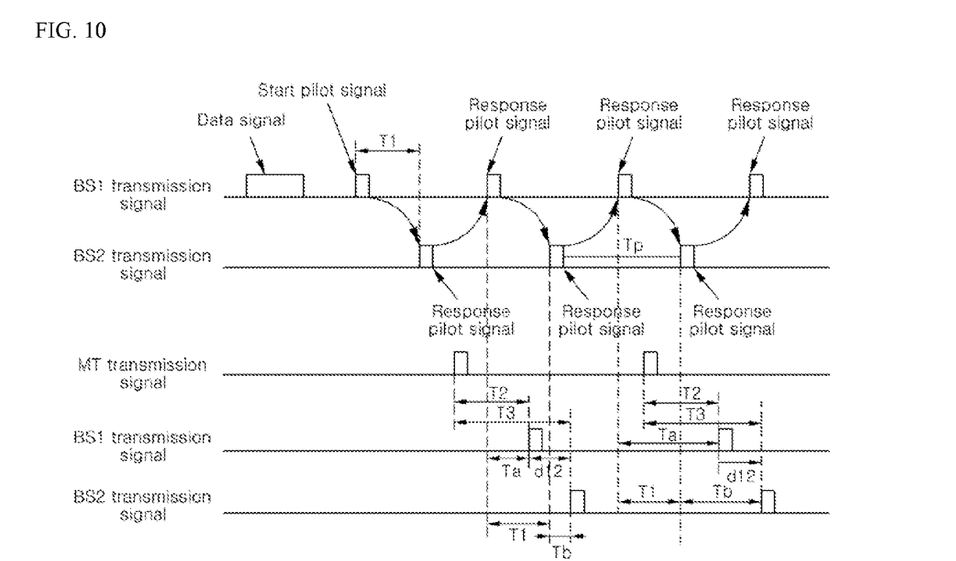
FIG. 10 is a view illustrating transmission signals of first and second BSs, a transmission signal of an MT, and reception signals of the first and second BSs of FIG. 9.

Hereinafter, a location measurement scheme in a location measurement system according to another exemplary embodiment of the present invention will be described with reference to FIGS. 9 and 10. The location measurement system and location measurement method of this embodiment use the aforementioned reference signal transmission system and method as in the above embodiment. FIG. 9 is a view illustrating a location measurement system according to another exemplary embodiment of the present invention. FIG. 10 is a view illustrating transmission signals of first and second BSs, a transmission signal of an MT, and reception signals of the first and second BSs of FIG. 9.

Referring to FIGS. 9 and 10, the location measurement system according to another exemplary embodiment of the present invention includes first to third BSs BS1, BS2, and BS3, an MT for transmitting a signal to the first to third BSs BS1, BS2, and BS3, and a location measurement device LM for controlling the BSs BS1, BS2, and BS3 and measuring the location of the MT using transmission and reception signals of the BSs BS1, BS2, and BS3.

A part denoted by dotted lines in FIG. 9 indicates a reference signal transmission system which is the same as the reference signal transmission system of FIG. 3 (the part denoted by dotted lines in FIG. 3). A reference signal transmission method performed in the reference signal transmission system of FIG. 9 is also the same as that performed in the reference signal transmission system of FIG. 3 and, therefore, a description thereof will be omitted.

Since the location of the MT is measured using the TDOA scheme as previously described, calculation of d12 will be focused upon hereinbelow. In particular, in this embodiment, d12 is a TDOA between signals transmitted from the first and second BSs BS1 and BS2 to the MT.

The MT transmits a signal including MT unique information to the first and second BSs BS1 and BS2.

The first and second BSs BS1 and BS2 transmit reference signals thereof and receive an MT transmission signal. That is, the first BS BS1 receives the MT transmission signal delayed by a signal shift time T2 between the first BS BS1 and the MT and the second BS BS2 receives the MT transmission signal delayed by a signal shift time T3 between the second BS BS2 and the MT.

The location measurement device LM obtains the aforementioned response signal period Tp using the BS1 reference signal transmitted by the first BS BS1 or the BS2 reference signal transmitted by the second BS BS2 and calculates a signal shift time T1 (T1=Tp*½) between the first and second BSs BS1 and BS2 from the response signal period Tp or obtains the signal shift time T1 from the BS related information.

The location measurement device LM calculates Ta, which is a TOA of the signal transmitted from the MT to the first BS BS1 (the difference between a transmission time of the reference signal of the first BS BS1 and a reception time of the signal from the MT), using the BS1 reference signal. The location measurement device also calculates Tb, which is a TOA of the signal transmitted from the MT to the second BS BS2 (the difference between a transmission time of the reference signal of the second BS BS2 and a reception time of the signal from the MT), using the BS2 reference signal. In this case, since the first and second BSs BS1 and BS2 of the present invention do not transmit signals synchronized at an absolute time, the difference between Ta and Tb (hereinafter, an initial TDOA), which is a TDOA between signals transmitted from the MT to the first and second BSs BS1 and BS2, is not a desired TDOA (d12, hereinafter, a final TDOA) between signals transmitted from the MT to the first and second BSs BS1 and BS. This is because, in this embodiment, the BS2 transmission signal is a signal more delayed by a signal shift time T1 between the first and second BSs BS1 and BS2 than the BS1 transmission signal.

Accordingly, in order to calculate the final TDOA d12, the location measurement device LM corrects the initial TOAs Ta and Tb or an initial TDOA in consideration of the signal shift time T1 between the first and second BSs BS1 and BS2 so as to eliminate an effect of the BS2 transmission signal more delayed than the BS1 transmission signal.

More specifically, in the TDOA scheme, the final TDOA d12 can be obtained by subtracting the larger of Ta and Tb from a value adding the smaller of Ta and Tb to the signal shift time T1 between the first and second BSs BS1 and BS2.

The location measurement device LM calculates location coordinates (x, y) of the MT using the obtained final TDOA d12 and location coordinates (x1, y1) and (x2, y2) of the first and second BSs BS1 and BS2.

Although the case in which delay does not occur between a reception signal of the response pilot signal and a transmission time of the response pilot signal in the first and second BSs BS1 and BS2 has been described, the delay may occur as described previously.

The delay may occur in the case in which the first BS BS1 transmits the BS1 response pilot signal after the first delay time Td1 upon receiving the BS2 response pilot signal and the second BS BS2 transmits the BS2 response pilot signal after the second delay time Td2 upon receiving the BS1 pilot signal (start pilot signal or response pilot signal).

In this case, since the method considering a delay time in the MT side (in this embodiment, the location measurement device LM) or eliminating delay time influence at the BS side are substantially the same as that described with reference to FIGS. 5 to 7, a detailed description thereof is omitted.

Figure 11:
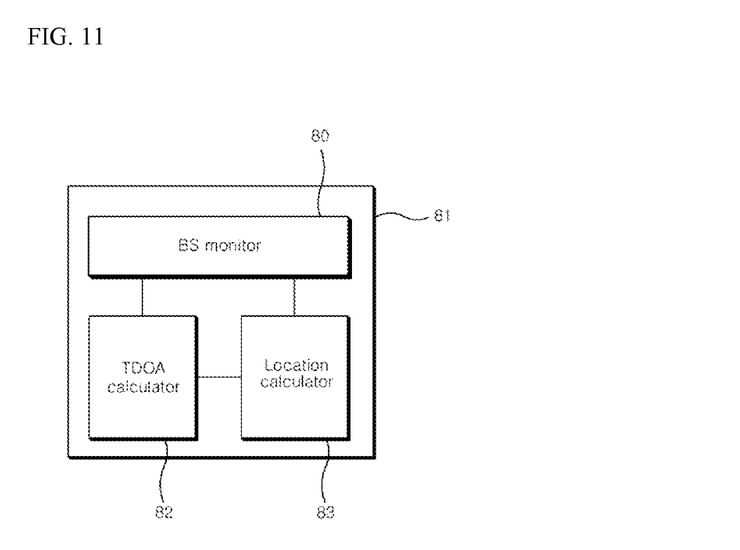
FIG. 11 is a block diagram illustrating a location measurement device according to another exemplary embodiment of the present invention.

FIG. 11 is a block diagram illustrating a location measurement device according to another exemplary embodiment of the present invention. The location measurement device of this embodiment performs an operation similar to that of the above-described location measurement device LM of FIG. 9.

As illustrated in FIG. 11, a location measurement device 80 according to an embodiment of the present invention includes a BS monitor 81, a TDOA calculator 82, and a location calculator 83.

The BS monitor 81 monitors transmission signals of the first and second BSs BS1 and BS2 generated using a mutual response scheme and reception signals received by the first and second BSs BS1 and BS2 from the MT and obtains information about the signals.

The TDOA calculator 82 calculates an initial TDOA Tr between signals transmitted from the first and second BSs BS1 and BS2 to the MT upon receiving signals from the MT by the first and second BSs BS1 and BS2. In this case, the initial TDOA Tr is the difference between a TOA of a signal transmitted to the first BS BS1 from the MT and a TOA of a signal transmitted to the second BS BS1 from the MT. Here, the TOA of the signal transmitted to the first BS BS1 from the MT is an initial TOA Ta which is the difference between a signal transmission time of the first BS BS1 and a signal reception time from the MT. The TOA of the signal transmitted to the second BS BS1 from the MT is an initial TOA Tb which is the difference between a signal transmission time of the second BS BS2 and a signal reception time from the MT. If a first delay time Td1 occurs in the first BS BS1, a second delay time Td2 occurs in the second BS BS2, and the first and second delay times Td1 and Td2 have different values, Td1 and Td2 are considered to calculate the initial TDOA Tr as in the above description.

The arrival time calculator 82 obtains a final TDOA ds1 by correcting the initial TDOA Tr in consideration of a signal shift time T1 between the first and second BSs BS1 and BS2, which is calculated using a period Tp of a signal received from the first or second BS BS1 or BS2 or which is obtained from BS related information. A detailed description thereof has been given above.

The location calculator 83 obtains a location (x, y) of the MT using the final TDOA d12 and previously obtained location coordinates (x1, y1) and (x2, y2) of the first and second BSs BS1 and BS2.

Hereinabove, the location measurement system, location measurement device, and location measurement method which are capable of measuring the location of the MT by calculating a TDOA between each BS and the MT using the reference signal transmission system and method have been described.

Further, in another exemplary embodiment of the present invention, time synchronization between signal sources (e.g. BSs) can be performed using the above-described reference signal transmission system and method, in a system necessary for time synchronization. The system necessary for time synchronization may be a system using a Location Based Service (LBS), a Real Time Location System (RTLS), Wi-Fi, TOA, CDMA, etc. This will be described in detail with reference to FIGS. 3 and 12.

The reference signal transmission system of FIG. 3 (refer to dotted lines of FIG. 3) transmits a reference signal using the mutual response scheme as described above and, therefore, a detailed description thereof will be omitted. If the reference signal transmission system of FIG. 3 is a system necessary for time synchronization, a BS included in the reference signal transmission system of FIG. 3, for example, the first BS BS1, may have a construction as illustrated in FIG. 12 and perform a time synchronization method which will be described with reference to FIG. 12.

Figure 12:
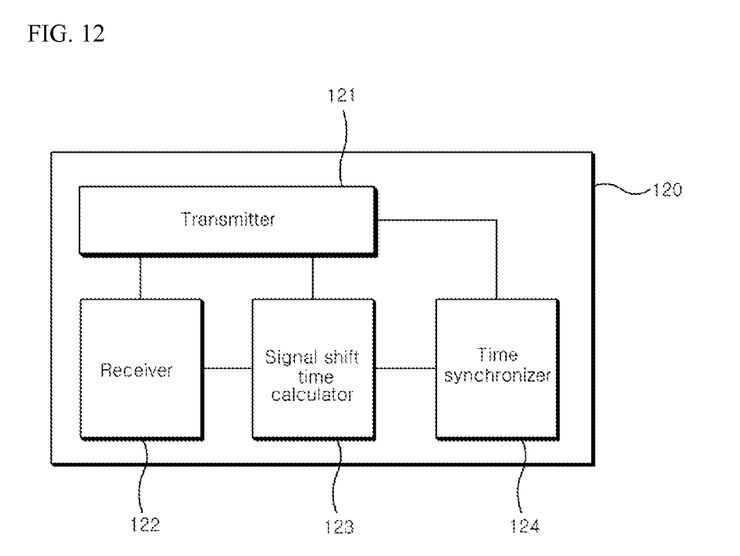
FIG. 12 is a view illustrating a BS included in a system necessary for time synchronization according to an exemplary embodiment of the present invention.

FIG. 12 is a view illustrating a BS included in a system necessary for time synchronization according to an exemplary embodiment of the present invention. The BS of FIG. 12 may be, for example, the first BS BS1 included in the reference signal transmission system of FIG. 3. However, the present invention is not limited thereto and BSs included in the system necessary for time synchronization transmit reference signals by the mutual response scheme and may have the same construction as the BS of this embodiment.

The construction of a BS and a time synchronization method in the BS will now be described with reference to FIG. 12. The first BS BS1 includes a transmitter 121 for transmitting a signal to the exterior, a receiver 122 for receiving a signal from the exterior, and a time synchronizer 124.

The transmitter 121 may transmit a BS1 reference signal as described above.

The receiver 122 may receive a reference signal of the other party BS, for example, a BS2 reference signal as described above.

The time synchronizer 124 synchronizes time of the first BS BS1 with time of the other BS, for example, the second BS BS2 by adjusting a time of a signal received by the second BS BS2 in consideration of a signal shift time T1 between the first BS BS1 and the second BS BS2. That is, the time synchronizer 124 advances or delays a time of a signal received by the second BS BS2 by T1 so as to synchronize the time of the first BS BS1 with the time of the second BS BS2. Therefore, the first BS BS1 can be time-synchronized with the second BS BS2 by a BS2 reference signal advanced or delayed by T1. In this way, time synchronization with the second BS can be performed and absolute time synchronization with other BSs can be performed.

The signal shift time T1 may be obtained by multiplying by a response signal period Tp acquired using a signal received from the first or second BS ½, as described above. To this end, the first BS BS1 may further include a signal shift time calculator 123. Alternatively, the signal shift time T1 between BSs may be obtained from BS related information and, in this case, the first BS BS1 need not include the signal shirt time calculator 123.

At least two signal sources included in the system necessary for time synchronization transmit reference signals by the aforementioned mutual response scheme and at least one of the two signal sources includes an element such as the time synchronizer 124, thereby implementing time synchronization between two BSs.

In summary, time synchronization between two BSs can be performed by advancing or delaying a signal synchronization time of any one BS by a signal shift time between the two BSs even without an additional time synchronization system. This can be extended and applied to all BSs included in the system necessary for time synchronization.

In a state in which time synchronization is achieved, if the two BSs transmit reference signals, the MT or location measurement device can measure the location thereof by calculating a TOA or TDOA using the conventional TOA or TDOA scheme.

The elements of FIGS. 5 to 8, 11 and 12 may be implemented by software such as a task, class, subroutine, process, object, execution thread, or program, by hardware such as a Field-Programmable Gate Array (FPGA) or an Application-Specific Integrated Circuit (ASIC), or by a combination of software and hardware. The above elements may be included in a computer-readable storage medium and a part thereof may be distributed among a plurality of computers.

As described above, the present invention proposes a new scheme capable of calculating a TDOA between two BSs and the MT even without time synchronization between two BSs. The present invention also proposes a new scheme capable of performing time synchronization between BSs without an additional time synchronization system. Accordingly, since a time synchronization system for location measurement need not be implemented, a small and simplified location measurement system can be achieved at low cost. Furthermore, since time synchronization error is eliminated, accuracy of location measurement can be improved.

The above-described reference signal transmission system and method may be applied to the location measurement technology or the time synchronization technology described in the embodiment of the present invention and also to other technologies. For example, if a reference signal transmitted in the reference signal transmission system of the present embodiment is reflected by an arbitrarily placed object, the location of the object can be obtained by receiving the reflected signal or a stereoscopic image of the object can be acquired by receiving the reflected signal.

As is apparent from the above description, the present invention provides a reference signal transmission method and system, a location measurement method, device, and system using the same, and a time synchronization method and device using the same, which are capable of accurately measuring the location of an MT by enabling calculation of a TDOA between each BS and the MT or enabling time synchronization, even without a time synchronization system, thereby preventing location measurement error caused by time synchronization error and achieving small size, simplification, and low cost of the location measurement system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for measuring a location of a mobile terminal, comprising:
    transmitting a reference signal of a first signal source in response to reception of a reference signal of the other signal source, including a step (a) of transmitting a reference signal at the second signal source in response to reception of the reference signal from the first signal source and a step (b) of transmitting a reference signal at the first signal source in response to reception of the reference signal from the second signal source, and performing the steps (a) and (b) repeatedly;
    receiving at a mobile terminal first and second reference signals from first and second signal sources for transmitting the first and second reference signals;
    calculating at the mobile terminal a Time Difference of Arrival (TDOA) between the first and second reference signals in consideration of the first and second reference signals received from the mobile terminal and a signal shift time between the first and second signal sources; and
    calculating at the mobile terminal the location of the mobile terminal using the TDOA and locations of the first and second signal sources;
    wherein a signal shift time (T1) between the first and second signal sources and a period (Tp) of the first reference signal or the second reference signal satisfies $T1=Tp*\frac{1}{2}$.

2. The method according to claim 1, wherein the calculation of the TDOA includes subtracting a signal shift time between the first and second signal sources from a difference between reception times of the first and second reference signals.

3. The method according to claim 1, wherein, in step (a), the second signal source transmits a second reference signal more delayed by a second delay time than a reception time of the first reference signal and, in step (b), the first signal source transmits a first reference signal more delayed by a first delay time than a reception time of the second reference signal.

4. The method according to claim 3, wherein, if the first delay time is different from the second delay time, one of steps (a) and (b) transmits a reference signal by equalizing the delay time in the corresponding step with the delay time in the other step.

5. The method according to claim 3, wherein, if the first delay time is different from the second delay time, the calculation of the TDOA considers the first and second delay times.

6. The method according to claim 5, wherein the calculation of the TDOA includes calculating a difference between reception times of the first and second reference signals in a state in which the first and second delay times are considered and subtracting a signal shift time between the first and second signal source from the difference between the reception times.

7. A method for measuring a location of a mobile terminal, comprising:
    transmitting a reference signal of a first signal source in response to reception of a reference signal of the other signal source:
    step (a) of transmitting a reference signal at the second signal source in response to reception of the reference signal from the first signal source;
    step (b) of transmitting a reference signal at the first signal source in response to reception of the reference signal from the second signal source,
    performing the steps (a) and (b) repeatedly,
    transmitting at the mobile terminal a signal for measuring a location of the mobile terminal;
    receiving a third signal transmitted from a mobile terminal, at the first and second signal sources for transmitting first and second reference signals;
    calculating at the first or second signal sources a Time Difference of Arrival (TDOA) of the third signal transmitted to the first and second reference signals in consideration of a signal shift time between the first and second signal sources; and
    calculating at the first or second signal sources the location of the mobile terminal using the TDOA and locations of the first and second signal sources;
    wherein a signal shift time (T1) between the first and second signal sources and a period (Tp) of the first reference signal or the second reference signal satisfies $T1=Tp*\frac{1}{2}$.

8. The method according to claim 7, wherein the calculation of the TDOA includes subtracting the larger of an arrival time of the first signal source of the third signal, wherein the arrival time is a difference between a transmission time of the first reference signal at the first signal source and a reception time of the third and signal and an arrival time of the second signal source of the third signal, wherein the arrival time is a difference between a transmission time of the second reference signal at the second signal source and a reception time of the third signal from a value obtained by adding the signal shift time between the first and second signal sources to the smaller of the arrival time of the first signal source of the third signal and the arrival time of the second signal source of the third signal.

9. The method according to claim 7, wherein, in step (a), the second signal source transmits a second reference signal more delayed by a second delay time than a reception time of the first reference signal and, in step (b), the first signal source transmits a first reference signal more delayed by a first delay time than a reception time of the second reference signal.

10. The method according to claim 9, wherein, if the first delay time is different from the second delay time, one of steps (a) and (b) transmits a reference signal by equalizing the delay time in the corresponding step with the delay time in the other step.

11. The method according to claim 9, wherein, if the first delay time is different from the second delay time, the calculation of the TDOA considers the first and second delay times.

* * * * *